United States Patent [19]

Porcelli

[11] Patent Number: 4,602,360
[45] Date of Patent: Jul. 22, 1986

[54] SOUND REPRODUCTION UNIT WITH MAGNETIC GOVERNOR

[75] Inventor: Anthony J. Porcelli, Torrance, Calif.

[73] Assignee: Mattel, Inc., Hawthorne, Calif.

[21] Appl. No.: 737,116

[22] Filed: May 23, 1985

[51] Int. Cl.⁴ ............................................. G11B 19/28
[52] U.S. Cl. .................................... 369/63; 369/241
[58] Field of Search .................. 369/241, 63, 65, 66, 369/67

[56] References Cited

U.S. PATENT DOCUMENTS

| | | | |
|---|---|---|---|
| 2,263,264 | 11/1941 | Duwe | 264/13 |
| 2,303,638 | 12/1942 | Helin | 172/284 |
| 2,847,095 | 8/1958 | Sohlberg et al. | 188/184 |
| 3,370,855 | 2/1968 | Lindsay | 274/1 |
| 3,450,239 | 6/1969 | Ryan et al. | 369/65 |
| 3,468,546 | 9/1969 | Duncan et al. | 274/9 |
| 3,477,728 | 11/1969 | Lindsay et al. | 274/1.1 |
| 3,501,154 | 3/1970 | Marshall et al. | 369/66 |
| 3,532,345 | 10/1970 | Barcus | 369/66 |
| 3,635,479 | 1/1972 | Osante | 274/17 |
| 3,656,815 | 4/1972 | Talebi et al. | 303/21 |
| 3,904,210 | 9/1975 | Licitis | 274/1 |

Primary Examiner—Steven L. Stephan
Attorney, Agent, or Firm—Ronald M. Goldman; John G. Mesaros; Melvin A. Klein

[57] ABSTRACT

A sound reproducing mechanism having a record member speed controlled by a governor mechanism assembled for rotation within a cylindrical housing, the governor including a driven first generally disc-shaped rotor having axially extending diametrically opposed fingers engaging enlarged diameter opposed apertures in a second generally disc-shaped rotor member having first and second magnets with arcuately configured outer edges slidably mounted thereon, the magnets coacting with the fingers and being selectively displaceable outwardly upon rotation, the outer arcuate surfaces having friction material thereon for engaging the inner surface of the cylindrical housing for regulating the speed of the record medium.

8 Claims, 5 Drawing Figures

SOUND REPRODUCTION UNIT WITH MAGNETIC GOVERNOR

BACKGROUND OF THE INVENTION

The background of the invention will be discussed in two parts:

1. Field of the Invention

This invention relates to sound reproduction devices, and more particularly to sound reproduction devices with magnetic governors for use in toys.

2. Description of the Prior Art

Mechanically actuated sound reproduction units have been used in toys for enabling a child to hear a saying, or the like from the toy, in response to actuation of a pull string, or operation of a lever, or the like. Such sound reproduction units are compact and include a record disc, cylinder or tape, with a number of different phrases, or sayings, which may be randomly, sequentially, or selectively reproduced.

A salient characteristic for such sound reproduction units is a governor, usually mechanical in form, which regulates the speed of the record or tape, to provide a reasonably faithful reproduction of the recorded sound. In a typical prior art unit, the governor will consist of pivoted weights, having friction pads such as brake shoes, operating against the interior of a drum-like housing, with the weights being spring-biased toward the center of the device. A conventional design of such a governor is shown and described in U.S. Pat. No. 2,847,095, issued Aug. 12, 1958 to Sohlberg, et al.

One such prior art sound reproduction unit with a mechanical governor is shown and described in U.S. Pat. No. 3,370,855, entitled "Audio Device", issued to Lindsay on Feb. 27, 1968, the governor using pivotable weights with brake pads operating against the interior of a cylindrical housing to regulate the speed of the turntable.

U.S. Pat. No. 3,468,546 directed to "Sequential Play Phonograph", issued to Duncan et al on Sept. 23, 1969, illustrates another sound reproduction unit, mechanically activated by a pull string, in which the governor is of the type having a rotor with spring loaded outwardly displaceable arms having friction pads on the outer surfaces thereof for frictionally engaging the interior of a drum like housing.

U.S. Pat. No. 3,477,728, issued Nov. 11, 1969, to Lindsay et al, for a "Cylinder-Type Talking Mechanism", the governor used therein being similar to that used in the above-discussed Lindsay U.S. Pat. No. 3,370,855.

A "Sound Reproducing Apparatus" is shown and described in U.S. Pat. No. 3,635,479, issued to Osante on Jan. 18, 1972, such patent disclosing a pair of arcuate weights pivotally coupled to a rotatable member with the outer periphery of the weights configured for frictionally engaging the inner surface of a drum like housing to regulate the speed of the sound reproduction medium.

Another "Sound Reproducing Device" is shown and described in U.S. Pat. No. 3,904,210, issued to Licitis, on Sept. 9, 1975, the device using a governor having a metallic disc rotating within an electromagnetic field created by a pair of oppositely positioned magnets on a U-shaped bracket, the disc rotating between the magnets to thus cut the lines of force created thereby.

Magnets, electromagnets and the general concept of the use of the force generated by such devices have been commonly used for devices other than governors. One such use, in measuring instruments, is shown in U.S. Pat. No. 2,263,264, issued Nov. 18, 1941 to Duwe, for a "Magnetic System for Measuring Devices", the patent disclosing a speedometer which employs the principle of the generation of eddy currents within a non-magnetic conducting member when interrupting the lines of force of a magnetic field.

U.S. Pat. No. 2,303,638, issued Dec. 1, 1942, entitled "Magnetic Transmission or Clutch", uses magnetic coupling between a driven and driving member in a clutch or transmission assembly.

U.S. Pat. No. 3,656,815, entitled "Vehicle Antiskid-Brake-System with Accelerometer", issued to Talebi, et al, on Apr. 18, 1972, and uses a solid cylindrical ferromagnetic rotor rotationally coupled to a vehicle wheel, the rotor being coated with a conductive nonferromagnetic material, with magnets generating an eddy current field in this coating, with pickup coils sensing the field to provide a differentiating signal which is a function of the angular acceleration of the rotor.

It is an object of the present invention to provide a new and improved sound reproducing mechanism for use in toys and the like.

It is another object of the present invention to provide a new and improved sound reproducing mechanism with magnetic governor means.

It is a further object of the present invention to provide a new and improved sound reproducing mechanism with a low cost magnetic governor.

SUMMARY OF THE INVENTION

The foregoing and other objects are accomplished by providing a sound reproducing mechanism having a record member speed controlled by a governor mechanism assembled for rotation within a cylindrical housing, the governor including a gear operated, gear driven first generally disc-shaped rotor having axially extending diametrically opposed fingers engaging enlarged diameter diametrically opposed apertures in a second generally disc-shaped rotor member having first and second attracting magnets with arcuately configured outer edges slidably mounted thereon, the magnets coacting with the fingers and being selectively displaceable outwardly upon rotation, the outer arcuate surfaces having friction material thereon for engaging the inner surface of the cylindrical housing for regulating the speed of the record medium.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
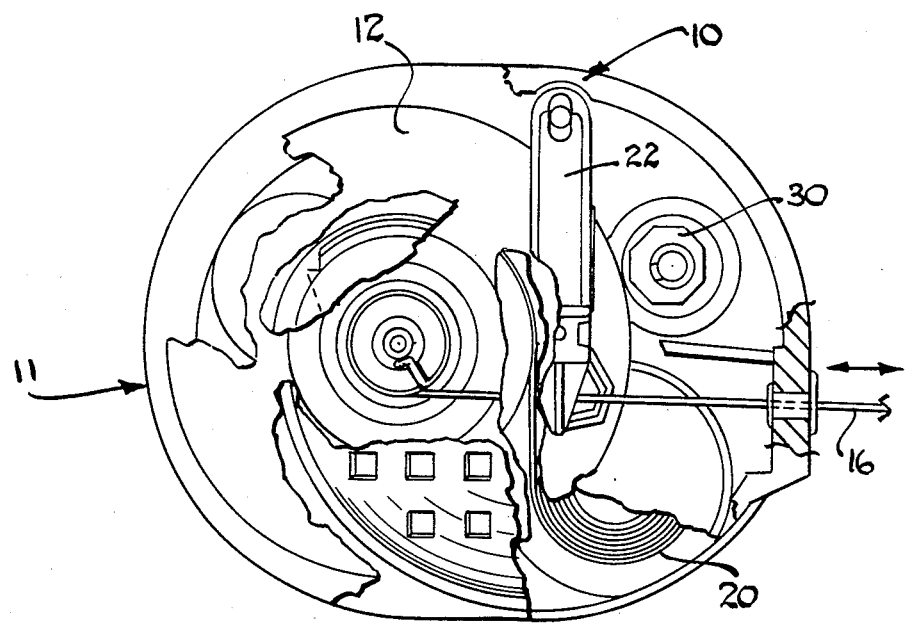
FIG. 1 is a plan view, partially broken away, and partially in cross-section, of the sound reproducing mechanism using the magnetic governor in accordance with the present invention.
Figure 2:
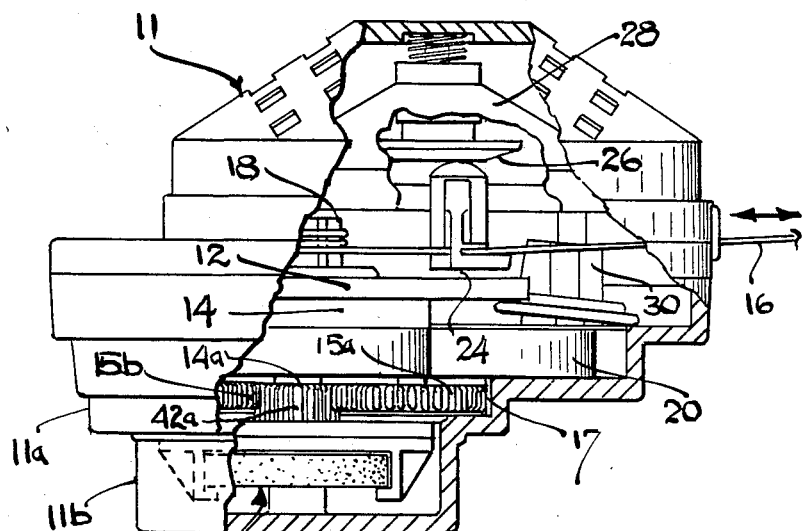
FIG. 2 is a side elevational view, partially broken away, of the sound reproducing mechanism of FIG. 1.

Referring now to the drawings, and particularly to FIGS. 1 and 2, there is shown a sound reproducing mechanism, generally designated 10, which includes a housing 11 with a record disc 12 coupled to a rotatably mounted turntable 14 therein, the record disc 12 having a plurality of prerecorded sound tracks thereon. Although the turntable 14 and disc 12 have been referred to separately, it is to be understood that with current manufacturing practices, the disc 12 and turntable 14 may be molded as a single unit.

The turntable 14 is driven by a drawstring 16 tied to and coiled about a spool 18 which is a central extension of the turntable 14. The turntable 14 is operated in a first direction of rotation under force of the drawstring 16, and then rotated in the opposite direction under force of a negator spring 20 which has one end thereof coupled to the turntable 14.

The housing 11 also contains therein a pivotally mounted tone arm 22 which coacts with the drawstring 16 which passes through an opening in one end of the tone arm 22. The tone arm 22 includes a needle member 24 which coacts with a selected sound track on the disc 12, with the tone arm 22, during its travel on the disc 12, being in constant contact with a plunger member 26 at the center of a generally conically configured spring loaded sound reproducing diaphragm or speaker member 28.

A sound track selection mechanism is provided by means of an eccentrically mounted rotatable octagonal cam member 30 positioned for adjustably limiting the outward pivoting of the tone arm 22 upon withdrawal of the drawstring 16. As best illustrated in FIG. 2, the drawstring 16 passes through an eyelet in the side of housing 11, and forms a slight upwardly directed angle from the point of passage through the end of the tone arm 22. Briefly, in operation, as the drawstring 16 is pulled, the tone arm 22 has the needle end thereof lifted from engagement with the disc 12, and the tone arm 22 is then pivoted toward the outer edge of the disc 12 until the tone arm 22 abuts against the selected face of the octagonal cam 30, which effectively selects the sound track for reproduction on release of the drawstring 16.

The cam 30 enables pivoting of the tone arm 22 through a given angle plus or minus a few degrees, this range of degrees corresponding to the radial distance on the disc 12 of the first and last sound reproducing tracks. With eight faces on the cam 30, eight tracks would be available for reproduction. The cam face positioning is determined randomly by means of an enlarged flange portion 30a of cam member 30 being in frictional engagement with the undersurface of the disc 12, as shown in FIG. 2. Thus, as the disc 12 rotates during the sound reproducing cycle, the cam member 30 rotates, with the "at rest" position being determined randomly.

The above mechanism and operation have been described briefly as illustrative of a particular type of sound reproducing mechanism which may be utilized with the governor in accordance with the invention. It is to be understood that various other type mechanisms may be employed such as those using cylindrical recording media or tape.

As shown in FIG. 2, the housing 11 has a portion 11a which houses a gear mechanism coupled for actuation with the turntable 14, and a bottom cup-shaped housing portion 11b which houses the governor mechanism, generally designated 40.

The turntable 14 is coupled to the governor mechanism 40 by suitable planetary gear means, including first and second gear members 15a and 15b coupled to shaft members 14a (only one of which is shown) depending from the underside of turntable 14. The inner diameter of housing portion 11a is geared to act as the stationary gear 17 of the planetary assembly with the gear members 15a and 15b meshingly engaging a pinion portion 42a of the governor mechanism. Thus, as the turntable 14 is rotated under force of the drawstring 16 or under the force of the negator spring 20, the pinion 42a drives the governor mechanism 40, which, as will be described herafter, regulates the speed of the turntable 14, and thus the speed of rotation of the disc 12.

Figure 3:
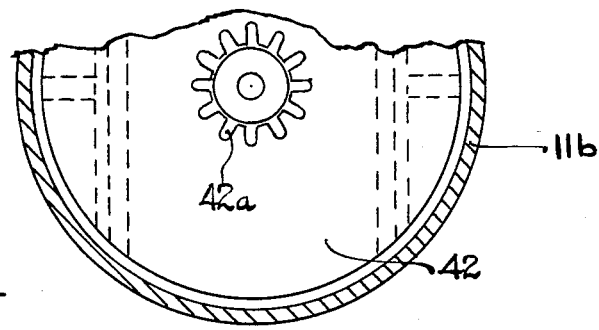
FIG. 3 is a partial top plan view of governor mechanism used in the sound reproducing mechanism of FIG. 1.
Figure 4:
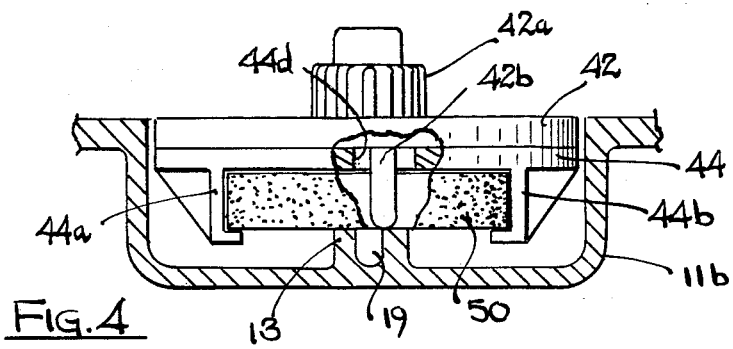
FIG. 4 is a side elevational view of the governor mechanism of FIG. 3.
Figure 5:
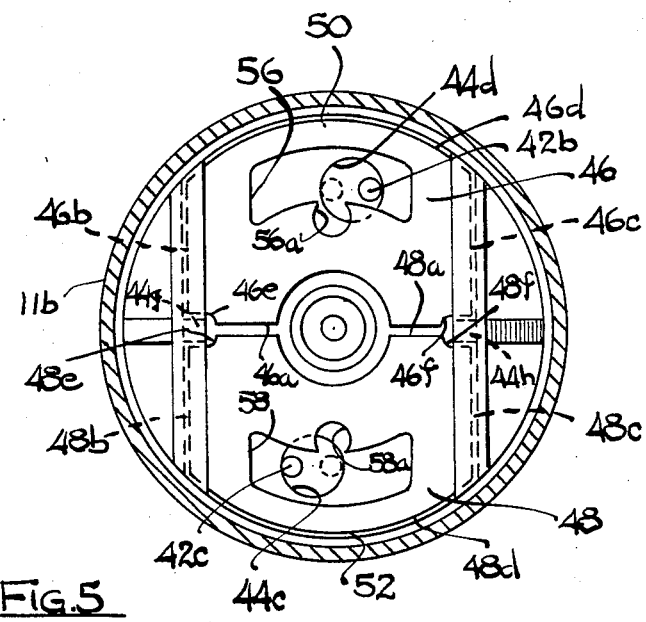
FIG. 5 is a bottom plan view of the governor mechanism of FIG. 3.

Referring also to FIG. 3 through 5, the governor mechanism 40 includes a first rotor 42, a second rotor 44, and first and second magnets 46 and 48. The rotor 42 is generally disc-shaped and contains the central pinion gear portion 42a extending from one surface thereof, and a pair of diametrically opposed axially extending fingers 42b and 42c extending from the opposite surface thereof. A central aperture is provided on the axis of rotation of the rotor 42 for passage therethrough of a shaft member 19 coupled to the turntable 14, the shaft member 19 (see FIG. 4) being received in a bearing cup 13 formed in the bottom of the housing portion 11b.

The second rotor member 44 is generally disc-shaped with one surface thereof having a pair of generally L-shaped generally parallel slide rail members 44a and 44b configured for slidably receiving therein the magnets 46 and 48 which are positioned with the poles thereof in attracting relation. The slide rail members 44a and 44b are each equally spaced from a diameter of the disc-shaped body portion of the rotor 44. Extending through the rotor 44 are first and second diametrically opposed apertures 44c and 44d at a radial distance equal to the radius of the fingers 42b and 42c on the first rotor 42. On assembly of the governor 40, these fingers 42b and 42c pass through the apertures 44c and 44d, respectively.

As better shown in FIG. 5, the apertures 44c and 44d lie on a diameter which is angularly displaced from the diameter intermediate the slide rails 44a and 44b. In addition, the fingers 42b and 42c have a diameter smaller than the diameter of the apertures 44c and 44d with which they coact, thus enabling a limited amount of angular displacement between rotors 42 and 44 upon rotational force being applied on rotation of the parts under force of the negator spring 20. The relative positions of the fingers 42b and 42c within the apertures 44c and 44d are shown in dotted lines, corresponding to the "at rest" position of the parts, with the solid line depictions of the fingers 42b and 42c illustrating the positions during pulling on the drawstring 16 for actuation of the mechanism. In the dotted line positions, the fingers 42b and 42c lie on the central diameter midway between and parallel to the slide rails 44a and 44b of rotor 44.

The magnets 46 and 48 have a width slightly less than the width between the slide rails 44a and 44b, for being slidably received therein. By reference to magnet 46, it has a first edge 46a which is generally planar with opposite sides 46b and 46c generally perpendicular to this edge and generally parallel to each other, the width between sides 46b and 46c being slightly less than the width between slide rails 44a and 44b. The edge 46d opposite edge 46a is arcuately configured with an arc diameter generally equal to the diameter of the cup-shaped housing portion 11b. A pad of friction material 50 is glued or bonded to this edge 46d for engaging the inner surface of the housing portion 11b.

The slide rails 44a, 44b are provided with inwardly extending stop portions 44g and 44h, respectively, at the midpoints thereof, with the notches 46e and 46f in the adjacent corners of the magnet 46 enabling positioning of the edge 46a of magnet 46 on the midline between the stop portions.

Magnet 48 is identically configured with a planar edge 48a, opposite parallel sides 48b and 48c engaged within slide rails 44a and 44b, and an arcuate front edge 48d with a pad 52 adhered thereto. The inner corners are provided with notches 48e and 48f, and in the "at rest" position, the edges 46a and 48a are magnetically drawn into abutting relation, although shown in spaced relation in FIG. 5 for illustrative purposes.

Each of the magnets 46 and 48 is provided with an arcuate opening 56, 58, respectively, with radially inwardly positioned generally circular sub openings 56a and 58a, respectively. The fingers or projections 42b and 42c of rotor 42 are of a length sufficient to extend into these openings 56 and 58 for interoperative coaction with the peripheral edges of the combined openings forming arcuate opening 56 and circular opening 56a, as well as the combined openings 58, 58a.

It is to be noted that the sub openings 56a and 58a lie on a line common with the dotted line depictions of fingers 42b and 42c. The dimension of the openings 56, 56a and 58, 58a are such that in the at rest portion, the edges 46a and 48a of magnets 46 and 48 are drawn together in abutting relation.

By reference to FIG. 5, the position of rotor 42 relative to rotor 44 is indicated by the positions of fingers 42b and 42c relative to the apertures 44c and 44d respectively. Upon pulling of the drawstring 16, the position is as shown in the solid line depiction of fingers 42b and 42c, that is, as rotor 42 is being rotated clockwise, the fingers 42b and 42c are displaced angularly clockwise relative to the respective apertures 44c and 44d. The diameter of the fingers 42b and 42c are such that lateral outward movement of the magnets 46 and 48 is restricted by coaction of the fingers with the adjacent edges of the arcuate openings 56 and 58, respectively. In this manner, the arrangement acts to limit lateral movement of the magnets 46 and 48 upon cocking of the sound reproducing mechanism 10 by assuring that the friction pads 50 and 52 do not engage the inner wall of the housing portion 11b. This eliminates the need for a one way clutch, thereby reducing cost.

Upon release of the drawstring 16, the return force of the spring 20 urges rotor 42 in a sudden counter clockwise direction as viewed in FIG. 5 at which point the fingers 42b and 42c are in the dotted line positions in radial alignment with the sub openings 56a and 58a, respectively. As the rotors 42 and 44 then turn in unison, the magnets 46 and 48 slide radially outwardly with the sub openings 56a and 58a sliding outward into engagement with fingers 42b and 42c, until ultimately the friction pads 50 and 52 come into contact with the inner periphery of the housing portion 11b, thus providing a braking action to regulate the speed of the mechanism. After completion of the tracking of the needle 24 with a selected sound track of the record disc 12, the mechanism tends to slow to a halt. The action of the weight "locking" device is so quick that the drawstring 16 may be pulled in mid-cycle and the mechanism will still function as desired.

The governor mechanism 40 herein described is compact, requires no springs and is extremely efficient in performance of the required function at a minimum number of parts and low cost. While there has been shown and described a preferred embodiment, it is to be understood that various other adaptations and modifications may be made within the spirit and scope of the invention.

I claim:

1. In a sound reproducing mechanism having a mechanically operated turntable with record means for reproducing a sound track thereon, the turntable being coupled for rotation with a governor mechanism comprising:

rotor means having slide rail means thereon, said rotor means having first and second rotor portions angularly displaceable relative to one another;

means interconnecting said first and second rotor portions for limiting angular displacement therebetween;

first and second magnet means positioned in attracting relation and slidably coupled to said slide rail means, said interconnecting means coacting with said magnet means to selectively limit radial displacement of said magnet means;

friction means on the outer extremities of said magnet means; and cylindrical wall means in proximate relation to said rotor means for being engaged by said friction means upon rotation of said rotor means and radial displacement of said magnet means whereby to regulate the speed of rotation of said turntable.

2. In a governor mechanism, the combination comprising:

cylindrical wall means;

rotor means mounted for rotation on the center of said cylindrical wall means and having slide rail means thereon, said rotor means being adapted for coupling to another rotatable device, said rotor means having first and second rotor portions angularly displaceable relative to one another;

means interconnecting said first and second rotor portions for limiting angular displacement therebetween;

first and second magnet means positioned in attracting relation and slidably coupled to said slide rail means, said interconnecting means coacting with said magnet means to selectively limit radial displacement of said magnet means; and friction means on the outer extremities of said magnet means in proximate relation to said cylindrical wall means for engagement therewith upon rotation of said rotor means and radial displacement of said magnet means whereby to regulate the speed of rotation of said another rotatable device.

3. In a sound reproducing mechanism having a mechanically operated turntable with record means for reproducing a sound track thereon, the turntable being coupled for rotation with a governor mechanism comprising:

rotor means having slide rail means thereon, said rotor means including a first rotor with a generally disc-shaped portion and a second rotor having a disc-shaped portion in generally abutting relation with the disc-shaped portion of said first rotor;

means for interconnecting said first and second rotors to provide for limited angular displacement therebetween;

first and second magnet means positioned in attracting relation and slidably coupled to said slide rail means with said interconnecting means coacting with said magnet means to selectively limit radial displacement of said magnet means;

friction means on the outer extremities of said magnet means; and cylindrical wall means in proximate relation to said rotor means for being engaged by said friction means upon rotation of said rotor means and radial displacement of said magnet means whereby to regulate the speed of rotation of said turntable.

4. The combination according to claim 3 wherein said slide rail means are on said second rotor.

5. The combination according to claim 4 whbrein said cylindrical wall means are formed as part of the housing of said sound reproducing mechanism.

6. In a governor mechanism, the combination comprising:

cylindrical wall means;

rotor means mounted for rotation on the center of said cylindrical wall means, said rotor means being adapted for coupling to another rotatable device, said rotor means including a first rotor with a generally disc-shaped portion and a second rotor having a disc-shaped portion in generally abutting relation with the disc-shaped portion of said first rotor, said second rotor having slide rail means thereon;

means for interconnecting said first and second rotors to provide for limited angular displacement therebetween;

first and second magnet means positioned in attracting relation and slidably coupled to said slide rail means with said interconnecting means coacting with said magnet means to selectively limit radial displacement thereof; and friction means on the outer extremities of said magnet means in proximate relation to said cylindrical wall means for engagement therewith upon rotation of said rotor means and radial displacement of said magnet means whereby to regulate the speed of rotation of said another rotatable device.

7. The combination according to claim 6 wherein said interconnecting means includes finger means on said first rotor extending through enlarged openings on said second rotor and through openings in said first and second magnets.

8. The combination according to claim 7 wherein said openings on said first and second magnets are configured to enable radial displacement of said magnets only with said finger means in a predetermined angular position relative to said openings in said second rotor.

* * * * *